Dec. 12, 1950   D. A. CLARK   2,533,432
HOSE REEL
Filed Aug. 28, 1946
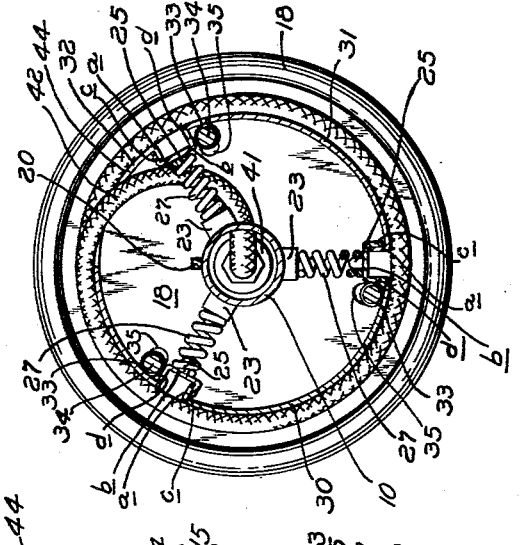
INVENTOR
DON A. CLARK
BY Philip A. Minnis
Hans G. Hoffmeister
ATTORNEYS Patented Dec. 12, 1950

2,533,432

UNITED STATES PATENT OFFICE 2,533,432

HOSE REEL

Don A. Clark, San Jose, Calif., assignor to Food Machinery and Chemical Corporation, a corporation of Delaware Application August 28, 1946, Serial No. 693,531

8 Claims. (Cl. 242—86)

The present invention relates to hose reels of the type used in fire fighting equipment.

Hoses employed in fire fighting equipment must be ready for instantaneous use at full pressure and capacity while still wound on the reel or during the process of unreeling because the time element is a decisive factor in all fire emergencies; also, depending on the relative location of the fire and the fire fighting equipment it may be necessary to use the hose with a portion thereof still wound on the reel.

When a deflated hose is wound on a reel it is usually somewhat flattened out due to the pull exerted in winding it up and due to the absence of any support from its interior, and in this condition it will offer considerable resistance to the passage of water. Water forced into a wound-up hose will, of course, tend to expand the hose but lack of space for expansion and the weight of superimposed layers will prevent, or at least materially retard, restoration of the hose to its rounded condition in which it may be operated at full capacity.

Therefore, to permit expansion of a wound-up hose under the impact of water, the hubs of hose reels for fire fighting equipment have in the past been constructed of a plurality of circularly disposed parallel rods or spokes, instead of a continuous cylindrical surface, with each spoke adapted to yield centripetally against the force of supporting springs under the hose-expanding pressure of inrushing water.

While such constructions have given a reasonable amount of satisfaction in the past, they are no longer adequate for modern fire fighting equipment which operates at nozzle pressures of 600 pounds or more. When a hose is wound over rods it does not curve evenly but is flattened out and bent or kinked over each individual rod and while such bends or kinks may not seriously interfere with the expansion of the hose or the flow of water as long as relatively low water pressures are employed, the shock of the initial water impact in modern high-pressure equipment is so strong and so sudden that such kinks have no time to straighten out smoothly and thus will throttle the initial flow of water and in turn suffer injury by the force of the initial impact thereof. Also back pressure set up by these kinks may in time excessively dilate preceding hose sections. Therefore, not only will the flow of water be impeded when conventional contractible reel constructions are employed in high-pressure fire-fighting equipment, but also the useful period of life of the hose itself will be materially shortened.

Broadly it is an object of the present invention to provide a hose reel permitting proper expansion of a hose wound thereon under the impact of inrushing water whether low or high water pressures are employed.

It is another object of the present invention to provide a hose reel suitable for use in high-pressure fire fighting equipment and adapted to permit instantaneous expansion of a hose wound thereon under the force of inrushing water without danger of injuring the hose structure.

It is yet another object of the present invention to furnish a hose reel suitable for high-pressure fire fighting equipment from which a wound-up hose may readily be unreeled, while traversed by water under high pressure, without interfering with the flow of water or injuring the hose structure.

More specifically, it is an object of the present invention to furnish a hose reel of the contractible type wherein a wound-up hose will curve evenly around the supporting hub without formation of kinks or bends.

It is another specific object of the present invention to provide a hose reel having a contractible hub accommodating the wound-up hose on broad cylindrical or arcuate surfaces instead of rods or spokes.

It is an additional object of the present invention to provide a hose reel of the type referred to, which while supporting said hose on a practically continuous arcuate or cylindrical surface, is adapted to accommodate both radial and lateral expansion of a hose wound thereon under the impact of water.

These and other objects of my invention will be apparent from the following description of the accompanying drawing which illustrates a preferred embodiment thereof by way of example and wherein:

Fig. 1 is a longitudinal section of a hose reel constructed in accordance with my invention, including the supports therefor, and Fig. 2 is a cross-section along line 2—2 of Fig. 1.

The hose reel in accordance with my invention possesses a tubular spindle 10 rotatably supported in two lateral brackets 11 and 12 respectively. One end of tubular spindle 10 is open and rests in a bearing 13 arranged in bracket 11 while the other end of spindle 10 is closed by a plug 14 rigidly secured thereto and provided with a stud 15 extending through a suitable opening in bracket 12. The projecting end of stud 15 may be equipped with a suitable crank for manual operation (not shown).

Spindle 10 carries two circular side plates or discs 18 and 19, respectively. Disc 18 is arranged to slide axially on spindle 10 but is prevented from rotational movement relative to spindle 10 by a key 20 projecting from spindle 10 and engaging a corresponding notch in disc 18 as shown in Figs. 1 and 2. The opposite disc 19 is rigidly secured to the other end of spindle 10 in any suitable manner.

At certain intervals in axial direction, spindle 10 is provided with a plurality of studs 23 projecting radially from its circumference at different angular positions thereof as may be seen more clearly in Fig. 2 which shows three such studs 23 spaced 120° apart.

Arranged concentrically around spindle 10 and supported resiliently by coil springs 27 mounted on studs 23 are three arcuate shells or drum segments 30, 31, and 32 respectively, each being provided with a number of pins 25 projecting radially from their inner surfaces at places opposite studs 23 to retain supporting springs 27 in their proper positions.

One longitudinal edge of each arcuate shell 30, 31, or 32, respectively, is turned inward to form a simple flange a, i. e., a radially descending flange, while the other longitudinal edge of each shell is turned inward to form a flat bottomed U-shaped lip b having an upwardly directed outer wall c, the arrangement being such that the flanges a engage the lips b of their adjacent shells. In the particular embodiment illustrated the above mentioned spring-retaining pins 25 are provided on the underside of lips b.

Rigidly attached to the underside of each arcuate shell are a number of axially aligned bushings 33. Three rods 34 extend through the aligned bushings of each of the three shells and loosely engage a corresponding number of circularly arranged guide slots 35 provided in each of side discs 18 and 19, to retain their associated arcuate shells in proper angular relation relative to spindle 10. Guide slots 35 are of a limited radial depth to positively limit radial expansion of arcuate shells 30, 31, and 32 under the urge of supporting compression springs 27 to the extreme outer positions shown in Figs. 1 and 2 wherein the inwardly directed flanges a bear against the inside of the upwardly directed walls c of lips b thus aligning arcuate shells or drum segments 30, 31, and 32 into a practically continuous expansible cylindrical surface capable of immediate contraction to smaller radii, as soon as pressure is exerted thereon, while still retaining their substantially continuous cylindrical circumference.

The projecting ends of supporting rods 34 are threaded and are provided with suitable nuts 36 and washers 37 but while nuts 36 and washers 37 bear directly against the outer surface of stationary side disc 19 preventing accidental escape of rods 34 through the radial guide slots 35 provided in disc 19, rods 34 extend some distance beyond slidable side disc 18 as shown in Fig. 1. Suitable compression springs 38 coiled around the projecting ends of supporting rods 34 are interposed between washers 37 and the outer surface of side disc 18 enabling this disc to resiliently yield towards the left end of spindle 10 as soon as pressure is applied against its inner surface.

A water supply conduit 40 of suitable design protrudes into the open end of tubular spindle 10 as shown in Fig. 1 and is connected by a universal joint 41 to the end of a water hose 42 in such a manner that hose 42 may freely turn in either direction about its longitudinal axis. Hose 42 is then conducted through a longitudinal slot 43 provided in tubular spindle 10 and a recess 44 cut out of a lateral edge of arcuate shell 32 to the right corner (Fig. 1) of the contractible cylindrical surface formed by shells 30, 31, and 32 and may be wound thereon in several layers in the customary manner.

A hose wound on the reel hub formed by arcuate shells 30, 31, and 32 will curve evenly without danger of forming kinks or bends due to the presence of an evenly curved and practically full supporting surface. The cylindrical supporting surface formed in accordance with my invention will readily contract to smaller radii as soon as pressure is exerted thereon, while retaining its practically continuous cylindrical circumference. The downwardly directed flanges a of the arcuate shells will merely move away from upwardly directed walls c and closer to the descending walls d of grooves b, with radial guide slots 35 in combination with supporting rods 34 insuring evenness of contraction. Tangential pull applied to the cylindrical surface such as may be exerted when a hose is hurriedly unreeled from its support will not be able to cause angular displacement of the components constituting my novel reel construction due to the positive manner in which tubular spindle 10 and arcuate shells 30, 31, and 32 are maintained in angular alignment by means of supporting rods 34 and guide slots 35 provided in side discs 18 and 19 which in turn are keyed to spindle 10.

When water is forced into deflated hose 42 by turning on water supply conduit 40, while the hose is wound on the reel, the hose will expand evenly and swiftly no matter how great the water pressures employed because there will be no bends and kinks to obstruct the inrushing stream of water and drum segments 30, 31, and 32 will immediately yield to the radial expansion of the hose revolutions while side disc 18 will recede to make room for any lateral expansion of the hose layers. Moreover, as the reel hub 30, 31, and 32 contracts to smaller radii the substantially full cylindrical shape of the supporting surface is maintained so that expanding hose 42 will glide smoothly on the hub surface without danger of abrasion, and the lateral expansion of the reel as provided by slidable side disc 18 prevents jamming of the expanding hose layers between the side walls of the reel thus enabling convenient unreeling of the hose in operation.

As soon as the water is turned off and the hydraulic pressure relaxes, supporting springs 27 will smoothly restore drum segments 30, 31, and 32 to their expanded positions and springs 38 will return slidable side disc 18 to its position of rest wherein it bears against the left arcuate edges of segments 30, 31, and 32 (Fig. 1).

Thus, my reel construction permits instantaneous use of a hose wound thereon without restriction of the flow of water or injury to the hose whether the hose is in a process of unreeling or whether the reel is at rest and no matter whether low or high water pressures are employed.

While I have shown the hub of my novel reel construction to be composed of three shells or segments, it will be understood that it may be composed of two, four or even more such shells or segments with a corresponding change in the number of the supporting springs without departing from the spirit of my invention. Also, both of the side walls of my reel construction may be arranged to yield in response to lateral pressure instead of only one as shown in the illustrated embodiment. Furthermore, it may be desirable under certain circumstances such as exceptionally hard conditions of wear, to provide more than one supporting rod for each shell segment.

Having thus described my invention and the manner in which it is to be performed, what I claim is:

1. A reel for hoses, including a rotatable spindle, a plurality of drum segments arranged concentrically around said spindle, one axial edge of each segment being bent inward to form a radially descending flange and the other axial edge of each segment being bent inward and outward to form a depressed U-shaped lip having a descending wall, a flat bottom and an outer upwardly directed wall, guide means for said drum segments mounted on said spindle for rotation therewith, means having operative connection with said guide means and attached to the under side of each of said segments, and spring means interposed between said spindle and the U-shaped lip of each of the segments to resiliently support said segments in positions wherein the descending flange of each of said segments is disposed within the U-shaped lip of the adjacent segment near the upwardly directed wall thereof to permit limited radial movement of said segments toward said spindle to positions wherein said descending flanges engage said lips near the descending walls thereof.

2. A reel for hoses, including a rotatable spindle, a plurality of drum segments arranged concentrically around said spindle, one axial edge of each segment being bent inwards to form a radially descending flange and the other axial edge of each segment bent inwards and upwards to form a depressed U-shaped lip having a descending wall, a flat bottom and an upwardly directed outer wall, guide means for said drum segments mounted on said spindle for rotation therewith, means on said segments having operative connection with said guide means, and a plurality of spring means interposed between said spindle and points on the underside of said lips, to resiliently support said segments in positions wherein the descending flanges of said segments engage the lips of their adjacent segments near the upwardly directed walls thereof, and said guide means being adapted to permit limited radial movement of said segments toward said spindle to positions wherein said descending flanges engage said lips near the descending walls thereof.

3. A reel for hoses, including a rotatable spindle, a plurality of arcuate drum segments arranged concentrically around said spindle, a plurality of first spring means disposed between said spindle and said segments to resiliently support said segments on said spindle, a disc mounted on said spindle at one side of said segments for rotation therewith, a second disc keyed on said spindle for rotation therewith but axially slidable along said spindle, a plurality of circularly arranged radial slots provided in each of said discs, a plurality of rods, each attached to one of said segments and engaging corresponding slots in said discs to confine said segments to limited radial movement toward and away from said spindle, said rods protruding beyond said slidable disc, and second spring means provided around the protruding ends of said rods and arranged to resiliently hold said slidable disc against the other side of said segments.

4. A reel for hoses, including a rotatable spindle, a plurality of drum segments arranged concentrically around said spindle, a depressed portion provided along one axial edge of each drum segment and adapted to support the opposite axial edge of an adjacent drum segment for sliding movement to provide an expansible cylindrical surface, guide means mounted on said spindle for rotation therewith and attached to the underside of each of said segments between the axial edges thereof, and spring means between said spindle and the depressed portion of each of said segments for supporting said segments in a position wherein said cylindrical surface is expanded to its maximum limit relative to said spindle and adapted to permit limited radial contraction of said cylindrical surface into greater proximity to said spindle.

5. A hose reel including a rotatable spindle, a pair of reel ends mounted on said spindle for rotation therewith and each provided with a plurality of circularly arranged radial guideways, at least one of said reel ends being slidable axially on said spindle, a plurality of rods extending through corresponding guideways of said reels, an arcuate segment attached to each of said rods for limited radial movement therewith toward and from said spindle, means for resiliently supporting said segments at radial attitudes wherein said segments are spaced apart from one another circumferentially, and spring means on the protruding ends of said rods for yieldingly holding said reel ends against the arcuate edges of said segments.

6. A hose reel including a rotatable spindle, a pair of reel ends mounted on said spindle for rotation therewith, at least one of said reel ends being slidable axially on said spindle, a plurality of rods supported on said reel ends in circular array around said spindle, an arcuate segment supported on each of said rods to provide a substantially continuous cylindrical drum, and spring means on said rods exteriorly of either of said reel ends and cooperating with said rods for yieldingly urging said reel ends toward the arcuate edges of said segments.

7. A hose reel including a rotatable spindle, a pair of reel ends mounted on said spindle for rotation therewith and provided with circularly arranged radial guideways, a plurality of rods each engaging corresponding guideways on said reel ends, a plurality of arcuate segments each attached to a respective one of said rods to provide a substantially cylindrical drum, a depressed portion provided along one axial edge of each of said segments for slidably supporting the opposite axial edge of an adjacent segment, and a spring means interposed between said spindle and the underside of the depressed portion of each of said segments for maintaining said segments in a position of maximum adjustment away from said spindle and permitting limited radial movement of said segments toward said spindle.

8. A hose reel including a rotatable spindle, a pair of reel ends mounted on said spindle for rotation therewith and each provided with circularly arranged radial guideways, at least one of said reel ends being slidable axially on said spindle, a plurality of rods each extending through corresponding guideways of said reel ends, a plurality of arcuate segments arranged concentrically around said spindle and each attached on their underside to a corresponding one of said rods, means associated with said rods for yieldingly urging said reel ends toward said segments, each of said segments having one axial edge recessed to slidably receive the opposite edge of an adjacent segment, and spring means supported on said spindle and engaging the underside of the recessed edge of each segment for urging said segments into their maximum position of adjustment as limited by the radial movement of said rods relative to the guide ways in said reel ends.

DON A. CLARK.

REFERENCES CITED

The following references are of record in the file of this patent:

UNITED STATES PATENTS

| Number | Name | Date |
|---|---|---|
| 1,971,165 | Parker | Aug. 21, 1934 |
| 2,010,811 | Craig | Aug. 13, 1935 |
| 2,071,731 | Craig et al. | Feb. 23, 1937 |
| 2,426,984 | Craig | Sept. 9, 1947 |